(12) United States Patent
Little

(10) Patent No.: US 8,189,972 B2
(45) Date of Patent: May 29, 2012

(54) OPTICAL MODE COUPLER

(75) Inventor: Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 327 days.

(21) Appl. No.: 12/416,023

(22) Filed: Mar. 31, 2009

(65) Prior Publication Data

US 2010/0247037 A1    Sep. 30, 2010

(51) Int. Cl.
*G02B 6/26* (2006.01)
(52) U.S. Cl. ............... 385/43; 385/15; 385/28; 385/30; 385/31; 385/39
(58) Field of Classification Search .................. 385/15, 385/27, 28, 30, 31, 39, 43
See application file for complete search history.

(56) References Cited

U.S. PATENT DOCUMENTS

| 6,293,688 B1 * | 9/2001 | Deacon | 362/556 |
| 6,330,378 B1 * | 12/2001 | Forrest et al. | 385/14 |
| 6,859,582 B2 * | 2/2005 | Cai et al. | 385/30 |

* cited by examiner

*Primary Examiner* — Jennifer Doan
(74) *Attorney, Agent, or Firm* — Duane Morris LLP; David L. Soltz

(57) ABSTRACT

An optical coupler includes a first waveguide configured to supply a first optical signal having a wavelength and a second waveguide. The first optical signal having a first mode. The first waveguide has a tapered portion being spaced from the second waveguide by a distance sufficient to facilitate evanescent coupling of the first optical signal from the first waveguide to the second waveguide. A first effective refractive index of the first waveguide at a location in the tapered portion being equal to a second effective refractive index at a location in the second waveguide. The first effective refractive index being associated with the first mode and the second effective refractive index being associated with a second mode of a second optical signal having the wavelength. The second mode having a different order than the first mode, and the second waveguide being configured to supply the second optical signal.

20 Claims, 5 Drawing Sheets

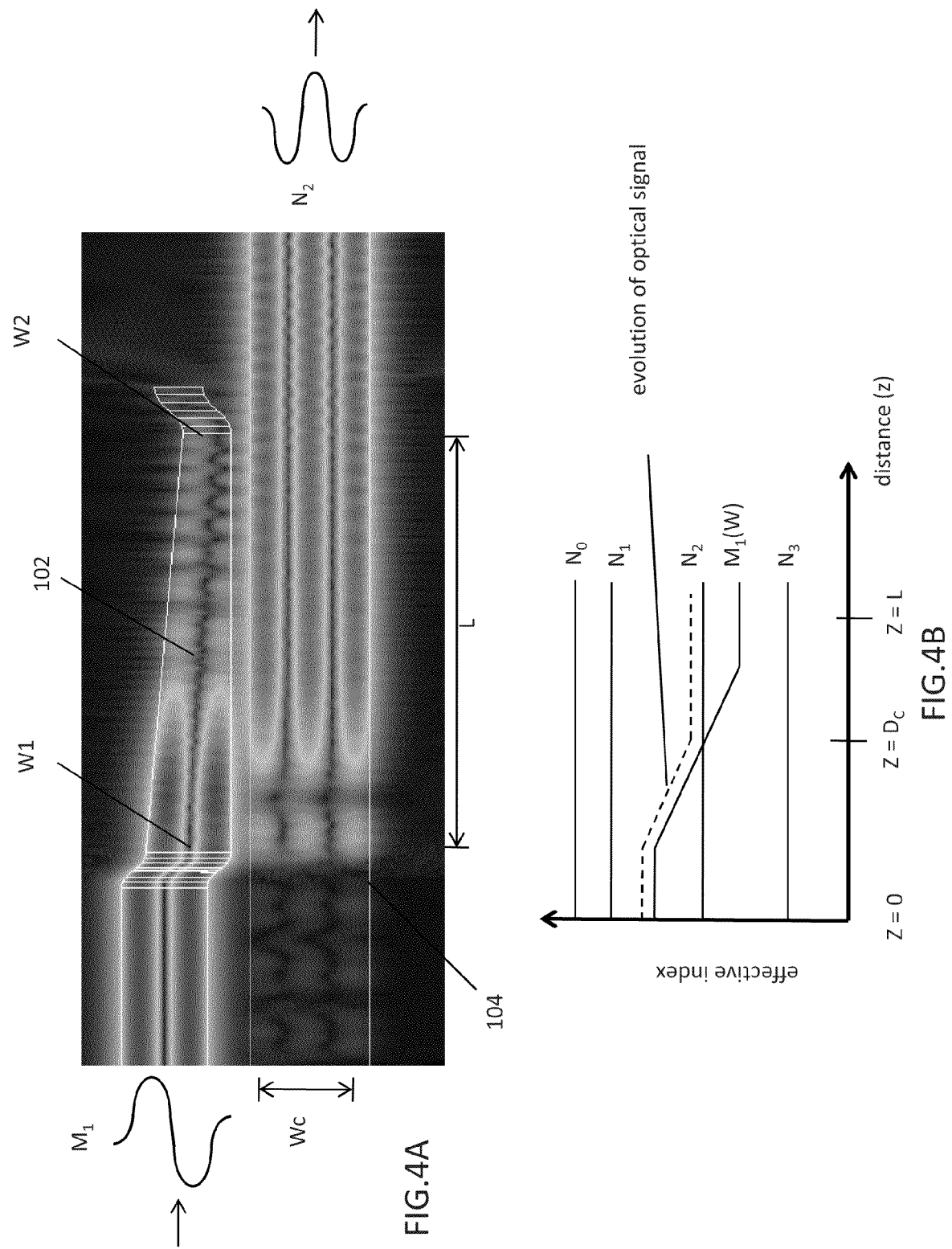

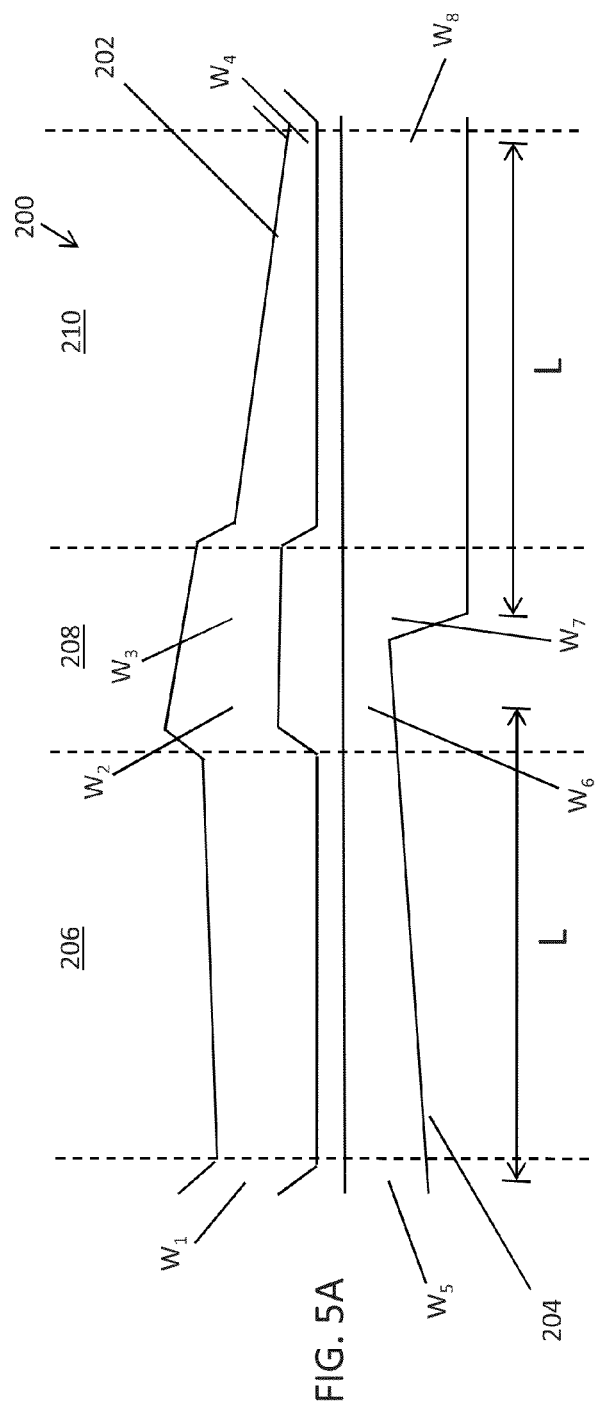
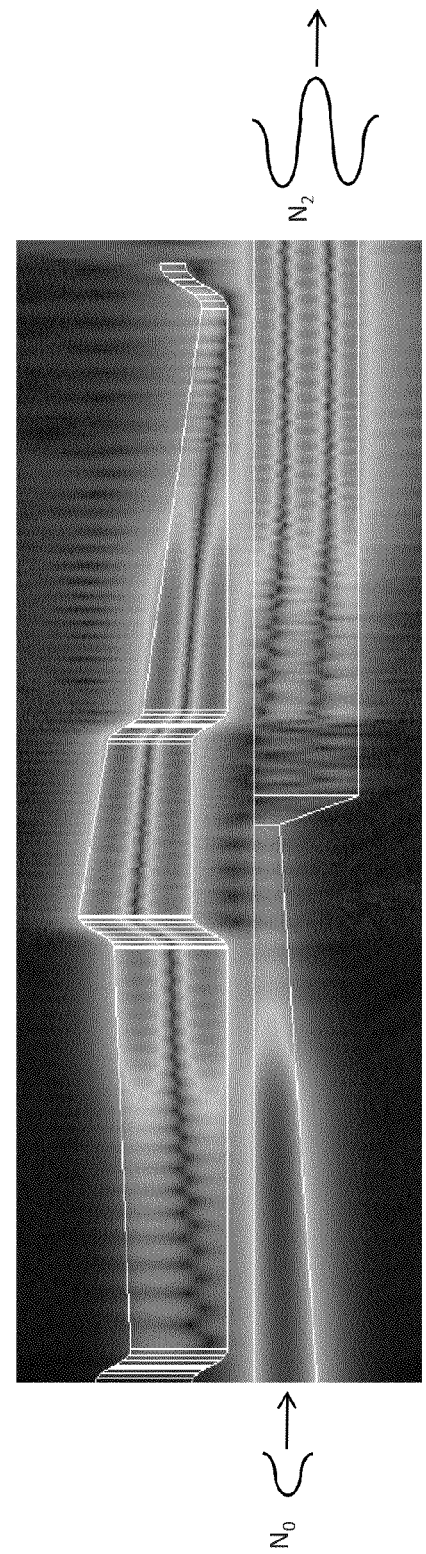
FIG. 5A
FIG. 5B

OPTICAL MODE COUPLER

FIELD OF DISCLOSURE

Embodiments of the invention relate to the field of optical communication devices. More particularly, the present invention relates to mode couplers for optical systems.

BACKGROUND

Energy associated with an optical signal may be spatially distributed as the optical signal propagates through a waveguide. Different distributions of such optical energy are often referred to as "modes". In a fundamental mode, the optical energy has a Gaussian distribution, whereby the optical energy is concentrated in the center of the waveguide and tapers off toward the edges of the waveguide. Higher order modes, such as second, third, etc. modes are associated with different spatial distributions of the optical energy.

Optical signals having multiple modes can simultaneously propagate in a waveguide. Conventionally, such multimode signals are generated by passing an optical signal having a signal mode or fundamental mode through a grating. The grating is specifically manufactured such that certain pre-defined modes are created in the waveguide as the initial optical signal passes through the grating. However, these gratings need to be precisely manufactured to tight tolerances. Otherwise, an optical signal with the desired modes will not be produced. For example, if the grating spacing is note precisely maintained, when the optical signal passes through the grating, undesired modes may be created. Additionally, such fabrication induced errors may result in power loss due to scattering.

Accordingly, an improved system of combining multiple modes of an optical signal is desirable.

SUMMARY

In one embodiment, an optical coupler includes a first waveguide configured to supply a first optical signal having a wavelength and a second waveguide. The first optical signal having a first mode. The first waveguide has a tapered portion that is spaced from the second waveguide by a distance sufficient to facilitate evanescent coupling of the first optical signal from the first waveguide to the second waveguide. A first effective refractive index of the first waveguide at a location in the tapered portion being equal to a second effective refractive index at a location in the second waveguide. The first effective refractive index being associated with the first mode and the second effective refractive index being associated with a second mode of a second optical signal having the wavelength. The second mode being different than the first mode, and the second waveguide being configured to supply the second optical signal.

In another embodiment, an optical coupler includes a coupling region. The coupling region includes a first portion of a first waveguide and a first portion of a second waveguide. The first portion of the first waveguide adiabatically tapers from a first width to a second width within the first coupling region. The first waveguide is configured to guide an optical signal in a first mode. The first portion of the second waveguide has a third width and is disposed adjacent to the first portion of the first waveguide such that an optical signal guided by the first portion of the first waveguide couples into the first portion of the second waveguide in a second mode. The modes being coupled are of a different mode order.

BRIEF DESCRIPTION OF THE DRAWINGS

FIG. 4A is a simulated coupling of a first higher order mode of an optical signal in a first waveguide being coupled into and exciting a second higher order mode of a second waveguide in accordance with the optical mode coupler illustrated in FIG. 1.

FIG. 4B is a graph of effective index of the waveguide modes versus distance of the waveguide modes in the optical mode coupler shown in FIG. 4A.

FIG. 5A illustrates one example of a cascade of optical mode couplers.

FIG. 5B is a simulation of a fundamental mode of an optical signal in a first waveguide being changed into a second higher order mode in accordance with the cascade of optical mode couplers illustrated in FIG. 5A.

DETAILED DESCRIPTION

Consistent with the present disclosure, an optical mode coupler includes a portion of first and second waveguides within a coupling region. An optical signal having a first mode traveling in the first waveguide is coupled into a second waveguide within the coupling region. The effective refractive indices of the first and/or second waveguides are adjusted within the coupling region such that when optical signal is coupled into the second waveguide it has a second mode that is of a different order than the first mode.

Figure 1:
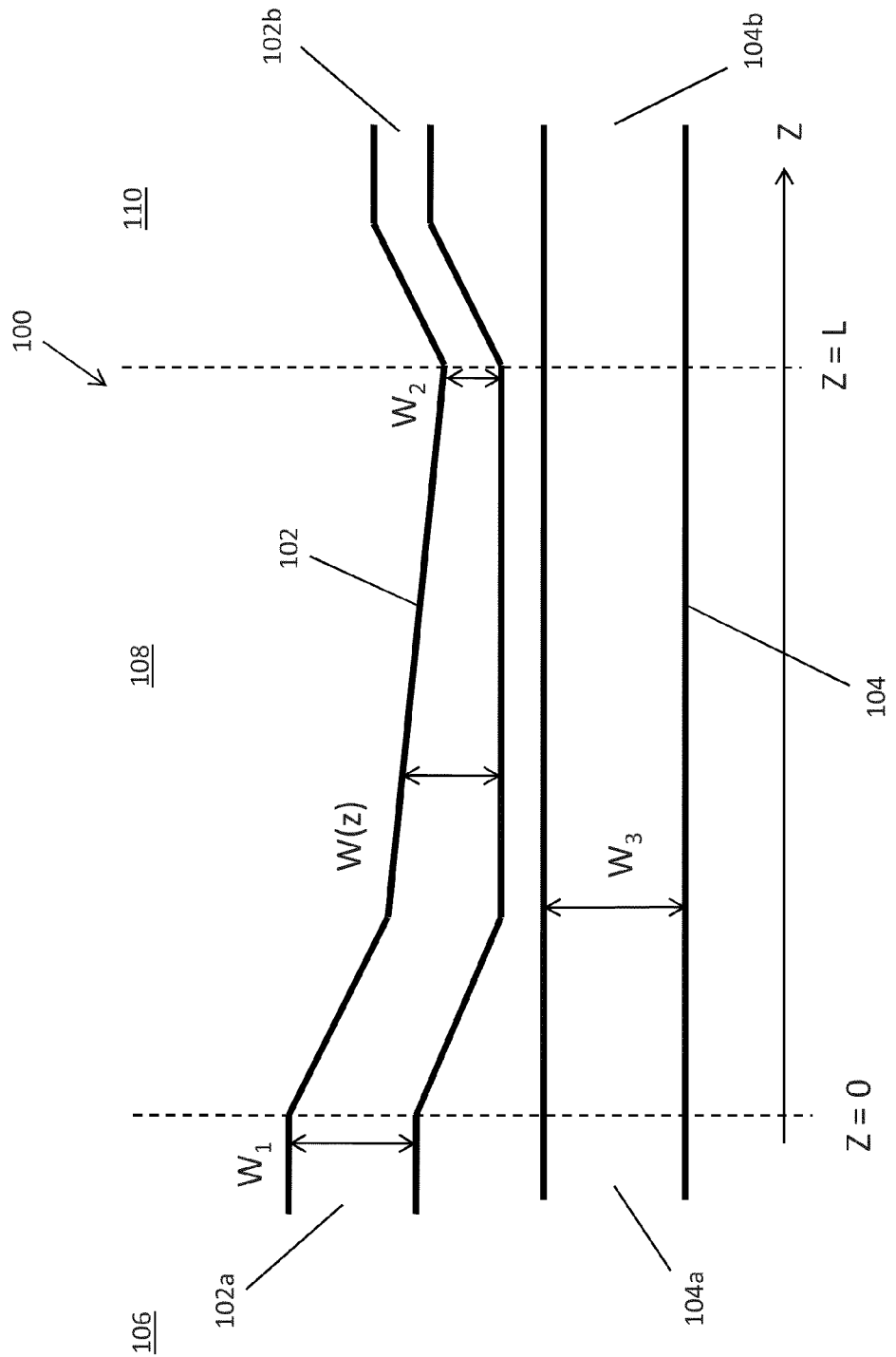
FIG. 1 illustrates one example of an optical mode coupler.

FIG. 1 illustrates one example of an optical mode coupler 100. As shown in FIG. 1, the optical mode coupler 100 includes a first waveguide 102 and a second waveguide 104 that extend from an isolation region 106 into a coupling region 108. The waveguides may then separate again forming a second isolation region 110. In one embodiment, the first waveguide 102 may be a tap waveguide configured to tap all or a portion of an optical signal traveling in the second waveguide 104 into the first waveguide 102. In other embodiments, the first waveguide may be an input waveguide receiving an optical input signal, which is then coupled into the second waveguide 102. As shown in FIG. 1, the first waveguide 102 may have an initial width, $W_1$, at a first end 102a and a second width, $W_2$, at a second or output end 102b. Preferably, the first waveguide 102 tapers in a direction extending from first end 102a to second end 102b. The second waveguide 104, however, may have a substantially constant width, $W_3$, from a first end 104a to a second end 104b. The width of the second waveguide 104 is sized such that second waveguide may support multiple modes of light at a given wavelength. In the first and second isolation regions 106, 110, the first and second waveguides 102, 104 are sufficiently spaced apart to prevent evanescent coupling of optical signals between the waveguides. Accordingly, the effective indices of the first and second waveguides 102, 104 may be adjusted within the isolations regions 106, 110 without causing an optical signal to couple from one waveguide into another waveguide.

Within the coupling region 108, the waveguides are spaced from each other such that an optical signal may be evanescently coupled from one waveguide, e.g., first waveguide 102, into the other waveguide, e.g., second waveguide 104. In the isolation regions 106, 110, the first and second waveguides 102, 104 are spaced such that an optical signal typically does not evanescently couple from one waveguide to another.

As generally understood, each of the modes or set of modes in the first and second waveguides 102, 104 has an effective refractive index that is based on the actual refractive index of each waveguide as well as other physical parameters including the width of the waveguide. To couple an optical signal from the first waveguide 102 into the second waveguide 104 and excite a higher order mode in the second waveguide 104, the effective refractive index of the mode in the first waveguide 102 is reduced with respect to the effective refractive index of the mode in the second waveguide 104 within the coupling region 108. This may be accomplished in a variety of ways. For example, the width of the first waveguide 102 may be decreased while the width of the second waveguide 104 is held constant as illustrated in FIG. 1, the width of the second waveguide 104 may be increased and the width of the first waveguide 102 may be held constant, or the width of the first waveguide 102 may be decreased while the width of the second waveguide 104 is simultaneously increased. The effective refractive index of the waveguide may also be changed by decreasing the waveguide height by etching, polishing, or selective growth of the waveguide. Additionally, the effective refractive index of the waveguide may be changed by modifying the material index through dopant concentrations, bleaching, selective growth, thermal-optical effects, electro-optic effects, or the like.

As illustrated in FIG. 1, the widths of the waveguides may be adjusted by tapering the waveguides within the coupling region 108. Although the first waveguide 102 in FIG. 1 is illustrated as linearly tapering, it will be understood that the taper may also be non-linear. Implementing the taper such that it is adiabatic prevents optical signal power from being lost due to radiation or signal scattering.

Figure 2A:
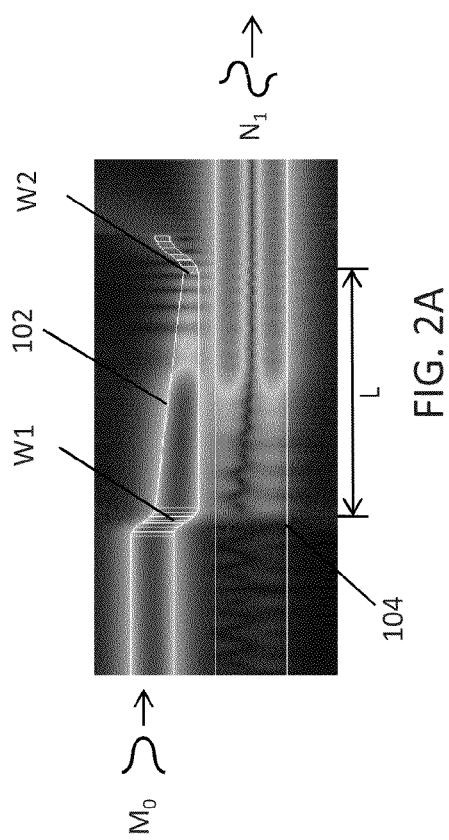
FIGS. 2A and 2B are simulated couplings of a fundamental mode being coupled into a first higher order mode in accordance with the optical mode coupler illustrated in FIG. 1.
Figure 2B:
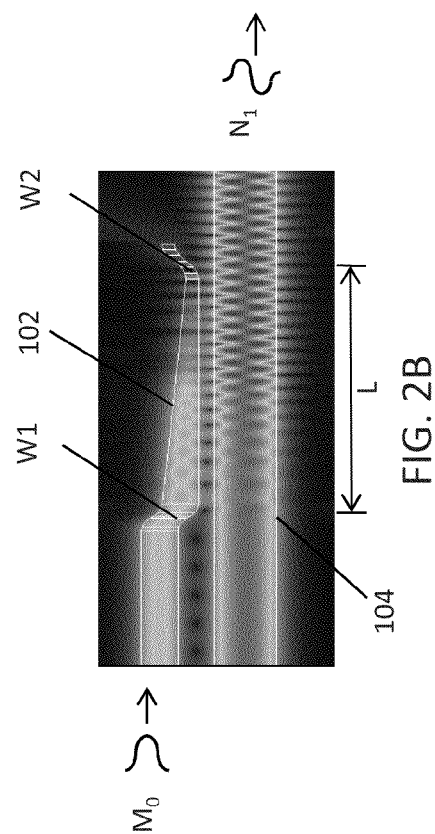

FIG. 2A shows a simulation of an optical mode coupler in accordance with the coupler illustrated in FIG. 1 in which a fundamental mode, $M_0$, in the first waveguide 102 is coupled into the second waveguide 104 as an optical signal of a first higher order mode, $N_1$. FIG. 2B shows a simulation of an optical mode coupler in accordance with the coupler illustrated in FIG. 1 in which the first waveguide 102 is a tap waveguide. The first waveguide 102 tapped a portion of the power of the optical signal in the second waveguide 104, e.g., 10%, and couples it back into the second waveguide 104, possibly after a dispersive element (e.g., a ring resonator or a delay line not shown in FIG. 2B) induced a frequency-dependent phase shift in the optical signal in the first waveguide 102. As can be seen in FIG. 2B, the coupler 100 may be used to create optical signals having any number of combined modes that may be phase-shifted with respect to each other.

FIGS. 2A and 2B were simulated for an optical signal having a wavelength of 1.55 μm propagating in a waveguide core having a refractive index of 1.65 and the surrounding cladding having a refractive index of 1.45. The width, $W_3$, of the second waveguide 104 was 2 μm, the initial width, $W_1$, of the first waveguide 102 was 1.5 μm, and the final width, $W_2$, of the first waveguide 102 was 0.6 μm. The length, L, of the adiabatic taper was 500 μm.

Figure 2C:
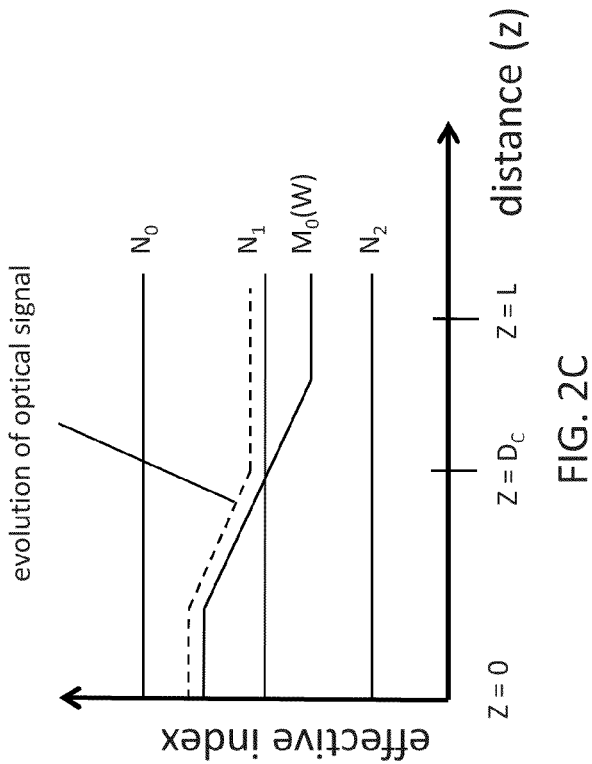
FIG. 2C is a graph of effective index of the waveguide modes versus distance of the waveguide modes in the optical mode coupler shown in FIG. 2A.

Advantageously, the length of the adiabatic taper, L, may be varied without having a detrimental effect on the performance of the coupler 100. For example, FIG. 2C is a graph of effective refractive index of the waveguide modes versus distance within the coupling region 108 of the coupler illustrated in FIG. 1. As shown in FIG. 2C, the adiabatic taper length, L, is greater than the coupling distance, $D_c$, e.g., the distance at which the optical signal is fully coupled into the second waveguide 104. The line $N_0$ in FIG. 2C corresponds to the effective refractive index of the fundamental mode in the second waveguide 104. Similarly, line $N_1$ corresponds to the effective refractive indices of the first higher order mode of the second waveguide 104, and line $N_2$ corresponds to the effective refractive index of the second higher order mode of the second waveguide 104. The line $M_0(W)$ corresponds to the effective refractive index of the fundamental mode of the first waveguide 102 as it varies as a function of width, W.

The dotted line in FIG. 2C illustrates the effective refractive index of the optical signal as it transitions from the first waveguide 102 into the second waveguide 104. As the width of the first waveguide 102 is reduced, the effective refractive index of the mode in the first waveguide 102 is also reduced. As the effective refractive index of the mode in the first waveguide 102 continues to reduce it eventually becomes less than the effective refractive index of the first higher order mode of the second waveguide, $N_1$. At this point, e.g., at coupling distance $D_c$, the optical signal in the first waveguide 102 couples into the second waveguide 104 as a first higher order mode optical signal as seen in FIG. 2A since the first and second waveguides 102, 104 are close enough to enable evanescent coupling of optical signals.

The optical signal couples into the second waveguide 104 as an optical signal of a higher order mode, $N_1$, and not the fundamental mode $N_0$, because the effective index of the optical signal in the first waveguide 102 is smaller than the effective index of the fundamental mode, $N_0$, in the second waveguide 104. The optical signal will only couple as a next available mode, e.g., mode $N_1$, and not a second higher order mode, $N_2$, as light does not jump or skip an available mode. Accordingly, the manufacturing tolerances for a coupler 100 may be reduced compared to conventional mode couplers as the length of the adiabatic taper may be varied without creating an undesired mode or modes as is a common problem for conventional couplers.

An optical signal may be able to be coupled from a fundamental mode in the first waveguide 102 into a second higher order mode in the second waveguide 104 by varying the effective refractive indices of the modes of waveguides 102, 104. For example, the effective refractive index of the first mode in the first waveguide 102, $M_0(W)$, may be reduced in the isolation region 106 from a point between the fundamental mode, $N_0$, and the first higher order mode, $N_1$, of the second waveguide 104 to a point between the first higher order mode, $N_1$, and the second higher order mode, $N_2$, of the second waveguide 104. Then, the effective index, $M_0(W)$, of the first waveguide 102 may be further reduced in the coupling region 108 such that it crosses the effective index of the effective index of the second higher order mode, $N_2$, at which point the optical signal will be coupled from a fundament mode in the first waveguide 102 into the second higher order mode of the second waveguide 104.

Figures 3A, 3B:
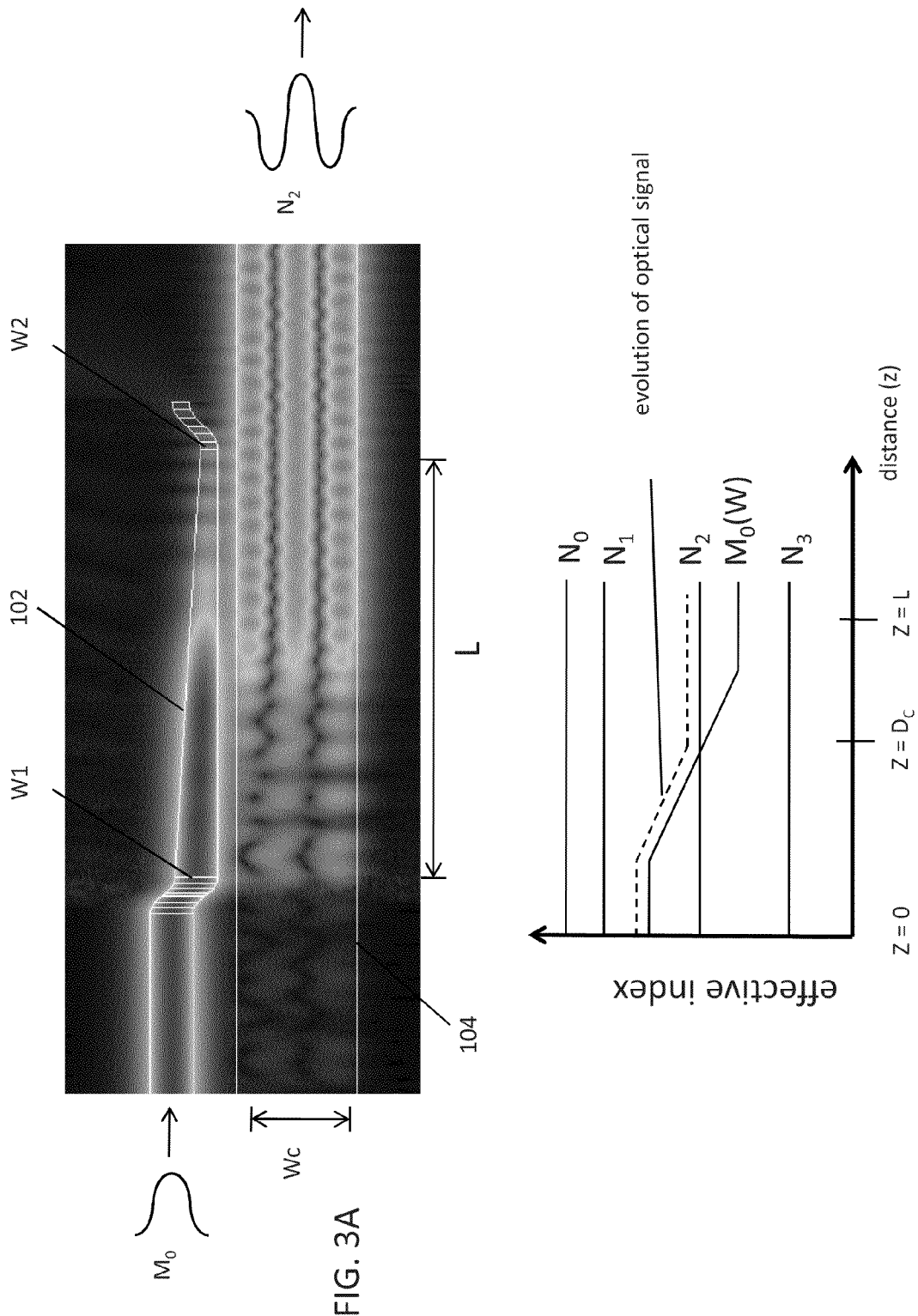
FIG. 3A is a simulated coupling of a fundamental mode of an optical signal in a second waveguide being coupled into and exciting a second higher order mode of a second waveguide in accordance with the optical mode coupler illustrated in FIG. 1.
FIG. 3B is a graph of effective index of the waveguide modes versus distance of the waveguide modes in the optical mode coupler shown in FIG. 3A.

Coupler 100 may also be configured to create an optical signal having a mode of a higher order than the first higher order mode, $N_1$, of the second waveguide 104. For example, coupler 100 may be designed such that a second ($N_2$), third ($N_3$), fourth ($N_4$), or other higher order mode of the second waveguide 104 is excited. FIG. 3A is a simulation showing a fundamental mode, $M_0$, of the first waveguide 102 being coupled into the second waveguide 104 and exciting the second higher order mode, $N_2$, of the second waveguide 104. The simulation was performed using a first waveguide 102 and an optical signal having the same or similar characteristics as the first waveguide 102 and optical signal described above with reference to FIGS. 2A and 2B. The width, $W_c$, of the second waveguide was increased to 4.2 µm. FIG. 3B is a graph of effective refractive indices versus distance illustrating the evolution of the optical signal illustrated in FIG. 3A.

Optical signals of a higher order than the fundamental mode (e.g., $N_1$, $N_2$, $N_3$, etc.) in the first waveguide 102 may be used to generate higher order modes (e.g., $M_1$, $M_2$, $M_3$, etc.) in the second waveguide 104 as well as lower order modes such as the fundamental mode, $M_0$. FIG. 4A is a simulation showing a first higher order mode, $M_1$, of the first waveguide 102 generating a second higher order mode, $N_2$, of the second waveguide 104. The simulation was performed using a first waveguide 102 having an initial width, $W_1$, of 3.0 µm, a final width, $W_2$, of 1.7 µm, and a length, L, of the adiabatic taper of 700 µm. The second waveguide 104 has a width, $W_c$, of 4.2 µm and the optical signal had the same characteristics of the optical signal described above with respect to FIGS. 2A and 2B. FIG. 4B is a graph of effective refractive indices of modes versus distance illustrating the evolution of the optical signal illustrated in FIG. 4B.

Multiple couplers 100 may be cascaded to convert an optical signal of a first mode into an optical signal of a second mode in the same waveguide. FIG. 5A illustrates one example of a mode coupler 200. As shown in FIG. 5A, the first waveguide 202 has a first width, $W_1$, that adiabatically tapers to a second width $W_2$. The second width, $W_2$, adiabatically tapers to a third width, $W_3$, which then adiabatically tapers to a fourth width, $W_4$. The second waveguide 204 adiabatically tapers from a fifth width, $W_5$, to a sixth width, $W_6$. The sixth width then tapers to a seventh width, $W_7$.

The mode coupler 200 illustrated in FIG. 5A is configured to couple an optical signal of a first mode in the second waveguide 204 into the first waveguide 202 in a first coupling region 206 such that the resultant optical signal is of a higher order. The higher order optical signal traveling along the first waveguide 202 is then coupled back into the second waveguide 204 in a second coupling region 210 at yet another higher order. One skilled in the art will understand that other mode couplers 200 may be designed by varying the adiabatic tapers of the first and second waveguides 202, 204. As shown in FIG. 5A, the widths of the first and second waveguides 202, 204 may be adjusted within the isolation region 208 to achieve the desired effective refractive index for coupling the optical signal into the desired mode in the next coupling region 210.

FIG. 5B is a simulation of the mode converter 200 illustrated in FIG. 5A. The simulation was performed using an optical signal having a wavelength of 1.55 µm in a waveguide core having a refractive index of 1.65 and the surrounding cladding having a refractive index of 1.45. The second waveguide 204 had an initial width, $W_5$, of 1.5 µm that adiabatically tapered to a second width, $W_6$, of 0.6 µm over a length of 700 µm. The sixth width, $W_6$, tapered to a seventh width, $W_7$, of 0.6 µm. The first waveguide 102 had an initial width, $W_1$, of 2.3 µm that adiabatically tapered to a second width, $W_2$, of 2.7 µm. The second width, $W_2$, of the first waveguide 202 adiabatically tapered to a third width, $W_3$, of 2.0 µm. The second waveguide 202 then tapered from the third width, $W_3$, of 2.0 µm to a fourth width, $W_4$, of 0.6 µm.

The couplers described above advantageously enable specific modes to be generated in a waveguide. The couplers may have relaxed tolerances compared to conventional couplers implemented using gratings as the couplers described herein are less prone to fabrication induced errors such as power loss and inadvertent mode excitation.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:

1. An optical coupler, comprising:
   a first waveguide configured to supply a first optical signal having a wavelength, the first optical signal having a first mode; and
   a second waveguide, wherein the first waveguide has a tapered portion, the tapered portion being spaced from the second waveguide by a distance sufficient to facilitate evanescent coupling of the first optical signal from the first waveguide to the second waveguide, a first effective refractive index of the first waveguide at a location in the tapered portion being equal to a second effective refractive index at a location in the second waveguide, the first effective refractive index being associated with the first mode and the second effective refractive index being associated with a second mode of a second optical signal having the wavelength, the second mode being different than the first mode, and the second waveguide being configured to supply the second optical signal, the first waveguide being laterally spaced from the second waveguide.

2. The coupler of claim 1, wherein the taper portion tapers from a first width to a second width, the second width being smaller than the first width.

3. The coupler of claim 1, wherein the second waveguide has a second tapered portion tapering from a third width to a fourth width.

4. The coupler of claim 3, wherein the third width is smaller than the fourth width.

5. An optical coupler, comprising: a first coupling region, including:
   a first portion of a first waveguide, the first portion of the first waveguide adiabatically tapering from a first width to a second width, the first waveguide configured to guide an optical signal in a first mode; and
   a first portion of a second waveguide, the first portion of the second waveguide having a third width, the first portion of the second waveguide disposed adjacent to the first portion of the first waveguide such that an optical signal guided by the first portion of the first waveguide couples into the first portion of the second waveguide in a second mode, wherein the modes being coupled are of a different mode order, the first waveguide being laterally spaced from the second waveguide.

6. The optical coupler of claim 5, wherein an effective index of a mode in the first portion of the first waveguide increases within the first coupling region from an effective index that is smaller than an effective index of a mode in the first portion of the second waveguide to an effective index that is greater than the effective index of a mode in the first portion of the second waveguide.

7. The optical coupler of claim 6, wherein the second guided mode is of a lower order than the first guided mode.

8. The optical coupler of claim 5, wherein an effective index of a mode in the first portion of the first waveguide decreases within the first coupling region from an effective index that is larger than an effective index of a mode in the first portion of the second waveguide to an effective index that is less than the effective index of a mode in the first portion of the second waveguide.

9. The optical coupler of claim 8, wherein the second guided mode is of a higher order than the first guided mode.

10. The optical coupler of claim 5, wherein the second waveguide adiabatically tapers from the third width to a fourth width within the first coupling region.

11. The optical coupler of claim 10, wherein the third width is greater than the fourth width, and the second width is greater than the first and third widths.

12. The optical coupler of claim 5, further comprising:
a second coupling region, including: a second portion of the first waveguide, the second portion of the first waveguide having a fourth width within the second coupling region; and
a second portion of the second waveguide, the second portion of the tapering from a fifth width to a sixth width within the second coupling region, the second portion of the second waveguide disposed adjacent to the second portion of the first waveguide such that the optical signal guided by the second portion of the second waveguide couples into the second portion of the first waveguide in a third guided mode.

13. The optical coupler of claim 12, wherein an effective index of a mode in the second portion of the second waveguide decreases with respect to an effective index of a mode in the second portion of the first waveguide within the second coupling region.

14. The optical coupler of claim 12, wherein an effective index of a mode in the second portion of the second waveguide increases with respect to an effective index of a mode in the second portion of the first waveguide within the second coupling region.

15. The optical coupler of claim 5, further comprising:
a second coupling region, including:
a second portion of the second waveguide, the second portion of the second waveguide tapering from a fourth width to a fifth width within the second coupling region; and
a first portion of a third waveguide, the first portion of the third waveguide disposed adjacent to the second portion of the second waveguide such that the optical signal guided by the second portion of the second waveguide couples into the first portion of the third waveguide in a third guided mode.

16. The optical coupler of claim 15, wherein an effective index of a mode in the second portion of the first waveguide decreases with respect to an effective index of a mode in the second portion of the second waveguide within the second coupling region.

17. The optical coupler of claim 15, wherein an effective index of a mode in the second portion of the first waveguide increases with respect to an effective index of a mode in the second portion of the second waveguide within the second coupling region.

18. The optical coupler of claim 5, further comprising:
a second coupling region, including: a second portion of the second waveguide having a fourth width; and
a first portion of a third waveguide tapering from a fifth width to a sixth width, the first portion of the third waveguide disposed adjacent to the second portion of the second waveguide such that the optical signal guided by the second portion of the second waveguide couples into the first portion of the third waveguide in a third guided mode.

19. The optical coupler of claim 18, wherein an effective index of a mode in the first portion of the third waveguide increases with respect to an effective index of a mode in the second portion of the second waveguide within the second coupling region.

20. The optical coupler of claim 18, wherein an effective index of a mode in the first portion of the third waveguide decreases with respect to an effective index of a mode in the second portion of the second waveguide within the second coupling region.

* * * * *